3,322,741
COMPOSITIONS COMPRISING THE HEAT REACTION PRODUCT OF 1,3,5-TRIACRYLYLHEXAHYDROTRIAZINE AND A POLYFUNCTIONAL AROMATIC AMINE

Richard Elliot Thornton Spalding, South Norwalk, Conn., assignor to American Cyanamid Company, Stamford, Conn., a corporation of Maine
No Drawing. Filed Oct. 1, 1964, Ser. No. 400,884
8 Claims. (Cl. 260—88.3)

The present invention relates to heat curable compositions, partially cured compositions and cured compositions which comprise a mixture of 1,3,5-trisacrylylhexahydrotriazine and a polyfunctional aromatic amine having at least two reactive amino groups per molecule. These compositions have utility in the plastics and resins area generally as molding resins, adhesives, laminating resins, potting resins, encapsulating resins and the like.

In a preferred concrete embodiment aspect the inventive concept involved herein concerns a series of resinous compositions comprising the compound 1,3,5-trisacrylyhexahydrotriazine and the compound 4,4'-diaminodiphenylmethane admixed in varying proportions of each but having the exemplary characteristic of being capable of thermal cure to obtain a resinous end product of extreme hardness when measured by the Barcol method.

In general the concrete embodiments obtained from my novel means of preparation are outstanding in the plastics and resins art for the excellent dimensional stability and electrical insulation properties which they show.

It is a long recognized fact that the reaction products of trisacrylyhexahydrotriazine and various aliphatic amines such as have been known to react to furnish valuable resinous materials as taught by U.S. Patent 2,559,694 to Zerner et al., which are useful coating materials for paper, wood, metal and cloth.

The first component of my novel composition may be illustrated graphically as a trisacrylylhexahydrotriazine of the general formula:

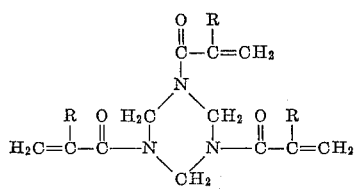

wherein R represents hydrogen, a methyl group or a chlorine atom which may be prepared by placing in a suitable reaction vessel provided with a stirrer, reflux condenser, thermometer and a dropping funnel, 265 parts by weight of acrylonitrile dissolved in 400 parts by weight of benzene and 2.8 parts of concentrated $H_2SO_4$. Place in the dropping funnel a solution of 150 parts by weight of trioxane dissolved in 400 parts by weight of benzene. Warm the acrylonitrile solution slightly and add the material in the dropping funnel at a rate so as to maintain reflux which is held for an additional 3 or 4 hours after all the material has been added. The yellow ppt which forms is the product which may be purified by recrystallization from ethanol.

The interreaction of the above material with a polyfunctional aromatic amine such as 4,4'-diaminodiphenylmethane or m-phenylene diamine at temperatures generally not in excess of 140° C. will yield a homogeneous melt which may be controlled in the rate of cure, easily handled and is capable of cure into a tough casting. This is quite unexpected when one considers that the known trisacrylylhexahydrotriazine amine condensates such as those disclosed in U.S. Patent 2,559,694 above prepared from reaction with aliphatic amines will not harden up into a casting but because of this failure may only be employed as coating resins, etc. where such hardness properties are not demanded. The basic problem with those condensates which harden into an intractable mass is that they cannot be controllably hardened into a suitable casting.

In general the trisacrylylhexahydrotriazine is present in the composition in ranges of from 34 to 96 percent by weight of the total composition. The preferred level of trisacrylylhexahydrotriazine to m-phenylene diamine is 45 percent by weight of trisacrylylhexahydrotriazine to 55 percent of m-phenylene diamine. At this level a composition for forming extremely hard castings may be obtained. In general the mol ratio of polyfunctional aromatic amine (such as m-phenylene diamine and 4,4'-diaminodiphenylmethane of the illustrative examples) to trisacrylylhexahydrotriazine may vary from 0.5 to 2 of polyamine to 1 of trisacrylylhexahydrotriazine.

In addition to the aromatic polyamines noted in the instant specification certain other well known amines have been found to perform in a similar and equivalent manner to those disclosed. For instance the compound 2,6-dimethyl piperazine may be used in the reaction to replace m-phenylene diamine of the reaction.

The following examples will illustrate several of the features of novelty of my invention. For a legal definition of its scope please direct attention to the several appended claims. The degrees in the examples are in centigrade unless otherwise indicated and the amounts in parts by weight.

*Example 1.—Preparation of a cured casting*

A mixture of 29.7 g. of 4,4'-diaminodiphenylmethane and 24.9 g. of triacrylylhexahydrotriazine were slowly heated to a homogeneous melt at 140° C. The melt was cast in a mold preheated to 170° C. The casting was cured 19½ hours in an oven at 175° C. The casting was tough and hard a Barcol hardness of 37–42.

*Example II.—Preparation of a partially cured composition*

A mixture of 486 g. m-phenylene diamine and 747 g. of triacrylylhexahydrotriazine was heated in an oil bath at 130° C. A homogeneous melt was obtained. An initial exothermic reaction was controlled by cooling so that the temperature did not exceed 140° C. After a total reaction time of 57 minutes, the resin was poured into a shallow tray and cooled as quickly as possible to room temperature.

The resulting resin softened at 50° and flowed at 65° C. It was soluble in methylene chloride and acetonitrile. On heating at 150° C., the resin fused then gelled in 15 minutes, and cured to a hard solid. It is understood that the aromatic amine component may bear other substituents such as alkyl groups or halogens and the like.

I claim:

1. A resinous composition comprising the heat reaction product of (A) a compound selected from the group consisting of 4,4'-diaminodiphenylmethane, m-phenylenediamine and 2,6-dimethyl piperazine and (B) a cross-linking compound having the formula:

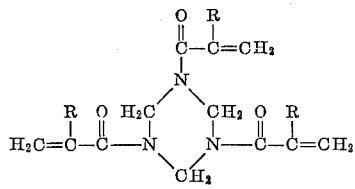

wherein R is selected from the group consisting of hydrogen, a methyl group and chlorine wherein the mol ratio of (A) to (B) is between about 0.5 to 2 of (A) per mol of (B).

2. The composition according to claim 1 in which the cross linking agent is 1,3,5-trisacrylylhexahydrotriazine.

3. The composition according to claim 1 in which the diamine compound is 4,4'-diaminodiphenylmethane.

4. The composition according to claim 2 in which the diamine compound is 4,4'-diaminodiphenylmethane.

5. The composition according to claim 1 in which the diamine compound is meta-phenylenediamine.

6. The composition according to claim 2 in which the diamine compound is meta-phenylenediamine.

7. A solid resinous molded article produced from the composition of claim 1.

8. A solid resinous molded article produced from the composition of claim 4.

References Cited
UNITED STATES PATENTS 2,643,958  6/1953  Kleiner et al. _____ 260—88.3

JOSEPH L. SCHOFER, *Primary Examiner.*

JAMES S. SEIDLECK, *Examiner.*

L. WOLF, *Assistant Examiner.*